(No Model.)
P. CAMPBELL.
CAR COUPLING.
No. 307,910. Patented Nov. 11, 1884.
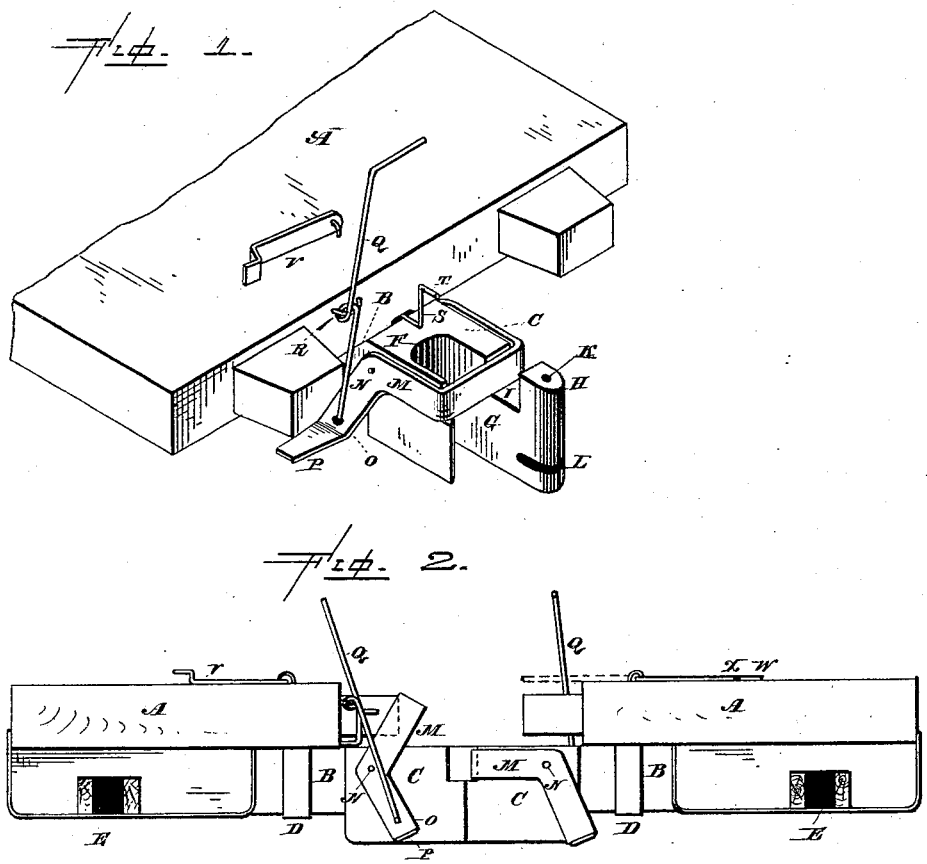
Witnesses.
Louis F. Gardner
J. W. Garner
Inventor.
Peter Campbell
per
F. A. Lehmann, Atty

UNITED STATES PATENT OFFICE.

PETER CAMPBELL, OF CARROLLTOWN, PENNSYLVANIA.

CAR-COUPLING.

SPECIFICATION forming part of Letters Patent No. 307,910, dated November 11, 1884.

Application filed March 31, 1884. (No model.)

*To all whom it may concern:*

Be it known that I, PETER CAMPBELL, of Carrolltown, in the county of Cambria and State of Pennsylvania, have invented certain new and useful Improvements in Car-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in car-couplings; and it consists in the combination of a draw-head having a hook formed as a forward extension of it, and a recess on the side of the hook to receive the hook of the second car, with a pivotal bail which is adapted to drop over the car opposite the draw-head, and thereby couple the cars together, as will be more fully set forth hereinafter.

In the accompanying drawings, Figure 1 is a perspective of one of my draw-heads with its coupling attachments complete. Fig. 2 is a side elevation showing the cars in the act of coupling.

A represents a car of the ordinary construction, to which is attached a draw-bar, B, having the enlarged head C. This draw-bar slides back and forth in a keeper, D, and is provided at its rear end with the spring-buffer E in the usual manner.

On one side of the draw-head C is formed a concave recess, F, and projecting out from the draw-head is an extension, G, having the hook H and a notch or recess, I, on its upper side.

Through the outer end of the hook H is made a vertical opening, K, and in its lower side is formed a horizontal recess, L. A car having the ordinary coupling-link can by this construction be connected to a car that is provided with my improved coupling by causing the link to enter into the recess L. The coupling-pin will in this case be passed vertically through the opening K.

M represents a bail, which is pivoted on the opposite sides of the head C by means of the bolt N. This bail is adapted to drop into the inner side of the recess I, as shown in dotted lines in Fig. 2. From this pivotal point the bail is provided with downward extensions O, having their lower ends bent outward at a right angle, as at P. These outer-bent ends form handles, by means of which the bail may be caused to assume the position shown to the left in Fig. 2 when it is desired to uncouple the cars from the ground.

Q represents a rod or lever that is fulcrumed to the end of the car, as at R, and which has its lower end pivoted in the lower end of one of the downward extensions of the coupling-bail, as shown. By means of this lever the cars may be uncoupled from the platform, as will be readily understood.

In order to secure the coupling-bail in a raised position when the cars uncouple, I provide a bent rod, S, which projects upwardly from the upper side of the draw-head, and which has its upper end, T, bent outwardly at a height corresponding to the path traversed by the coupling-bail. When the bail is elevated, its under side rests on the upper side of this bent end, and is thereby held in place and prevented from dropping from any other cause than by the act of two cars running together when it is desired to couple them.

The operation of my invention is as follows: When the cars are uncoupled, the spring-buffers press the draw-heads outwardly in the position shown in Fig. 2. When the cars are run together, the hooks of the draw-heads enter the recesses F, and the impact of the cars causes the draw-heads to move inwardly, thereby dislodging the coupling by means of their supporting-rods, when they will drop by their own gravity into the notches I and over the hooks of the opposite car. The hooks and the coupling-bails of both draw-heads are thus employed to couple the cars, and should either one of them break while the cars are in motion the other will retain its hold and prevent the cars from becoming detached, as will be readily understood.

In order to secure the coupling-bail in an elevated position, should it be desired to run the cars together and not couple them, I provide a latch, V, which is secured to the outer side of the car-platform, as shown. This latch catches over the outer side of the coupling-bail, and thus holds it in position. If preferred, a latch, W, may be employed for the same purpose, and instead of catching over the bail it will be provided with the recess X, for engaging with the coupling-lever, as is illustrated in dotted lines in Fig. 2.

A car-coupling thus constructed is adapted to couple cars of different heights, and can be operated on short curves. The formation of the hooks prevents sidewise movement and consequent uncoupling of the cars.

Having thus described my invention, I claim—

A draw-head having an extension, G, hook H, recess I on one side, and a recess, F, on the opposite side, in combination with the coupling-bail that is pivoted thereto, said bail having downward extensions that are formed into handles for the purpose of enabling it to be operated from the ground, a lever connected thereto and to the car to enable it to be operated from the car-platform, and a suitable device for securing the coupling-bail into an elevated position, substantially as shown and described.

In testimony whereof I affix my signature in presence of two witnesses.

PETER CAMPBELL.

Witnesses:
 JOHN PORTER,
 JOSEPH V. MANCHER.